May 17, 1932.    F. B. KUCZYNSKI    1,859,147
APPARATUS FOR PRESERVING NATURAL FOODSTUFFS
Filed Oct. 8, 1928    2 Sheets-Sheet 2
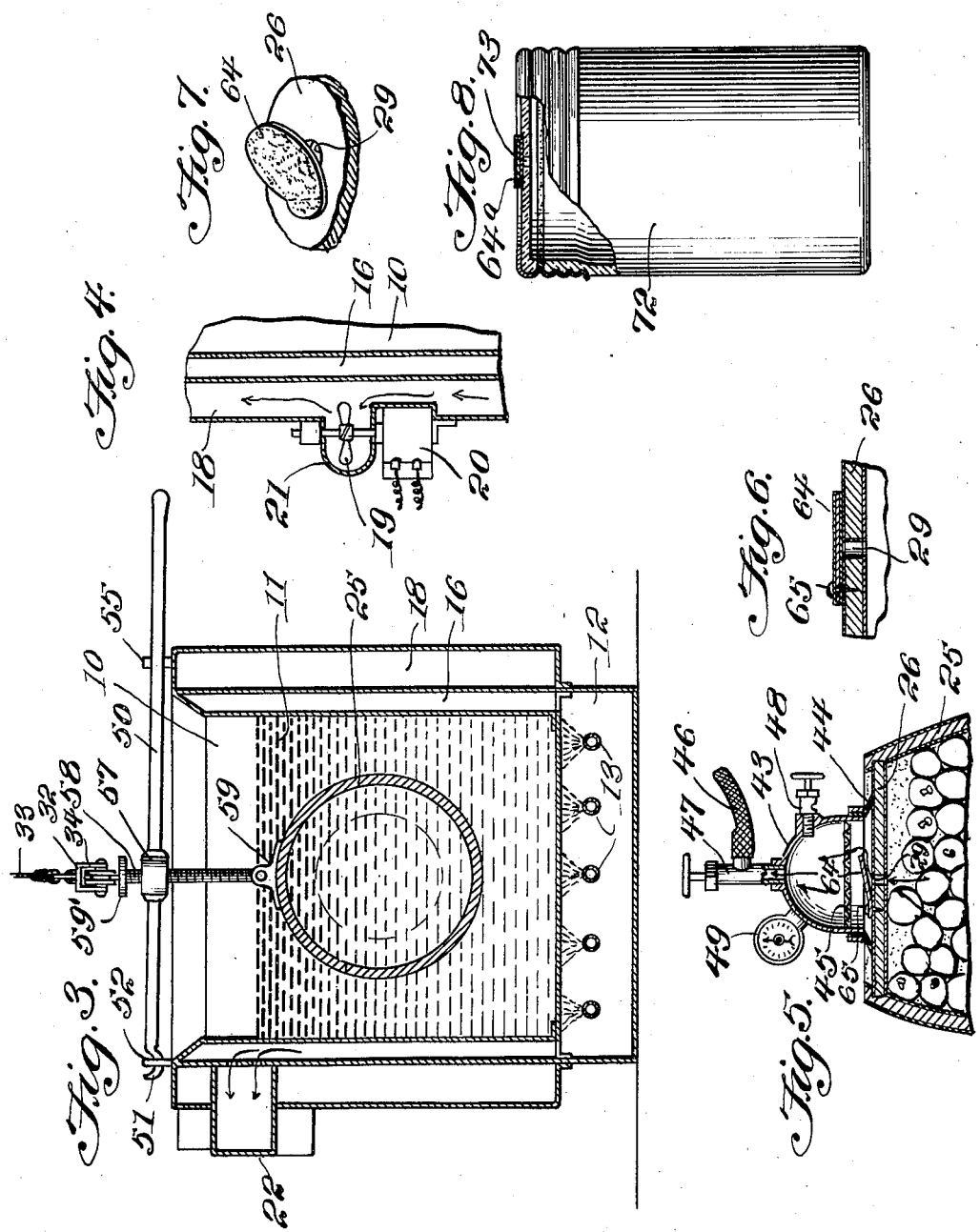

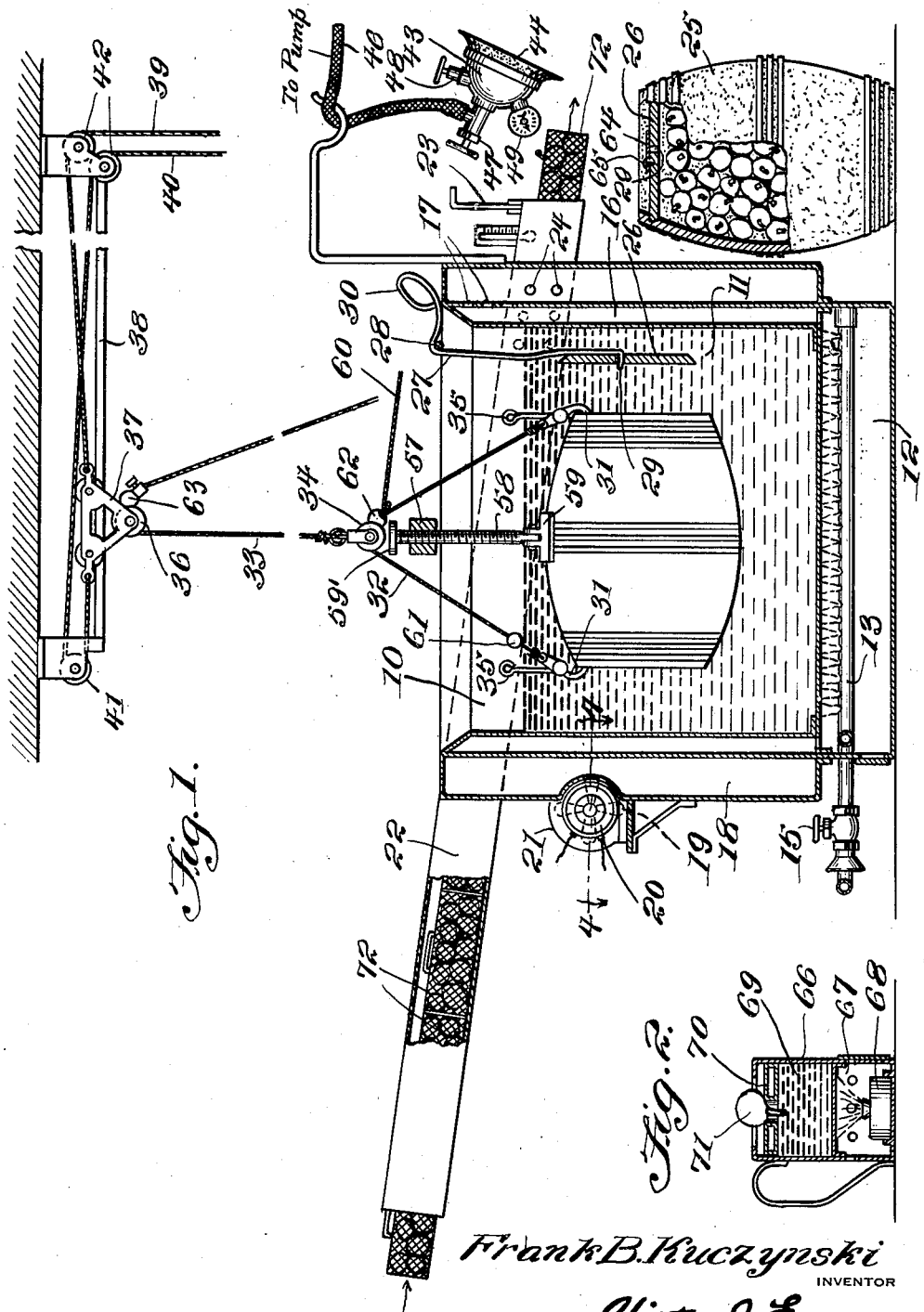

Patented May 17, 1932

1,859,147

UNITED STATES PATENT OFFICE

FRANK B. KUCZYNSKI, OF LEAVENWORTH, KANSAS

APPARATUS FOR PRESERVING NATURAL FOODSTUFFS

Application filed October 8, 1928. Serial No. 311,156.

This invention relates to apparatus for preserving natural food stuffs such as fruits, vegetables, meats, etc., and has for an object the provision of means for treating and packing food stuffs so that they may be kept natural for an indefinite period without spoiling.

As is well known, bacteria is found everywhere except in the healthy tissues of plants and animals, and with this in mind, the present invention has for an object the provision of means for expelling bacteria from the articles to be preserved, not killing the bacteria, as dead bacteria are more dangerous than live bacteria. Therefore, it is not the purpose of the present invention to sterilize or pasteurize the foods (the latter method requiring a temperature of from 145 degrees to 165 degrees Fahrenheit) to kill bacteria, but to "Kuczynskiise" the food stuffs, a method requiring a temperature between 130 degrees and 145 degrees Fahrenheit. It may be here stated that where "Kuczynskiise" to "Kuczynskiization" is used, it refers to the method hereinafter described.

Another object of the invention is the provision of means of the above character in which fruit to be preserved is sealed against the admission of air into said fruit, so that the fruit will retain its natural condition and flavor and after undergoing the preserving process, the fruit will remain in its natural state.

Another object of the invention is the provision of a method of preserving natural food stuffs wherein the process of preserving is carried out in a manner to effectually prevent oxidation and the formation of virulent type bacteria, the process being such as to accomplish this result with a temperature not in excess of one hundred and forty four degrees Fahrenheit, which is about 68 degrees Fahrenheit below the minimum temperature of other preserving methods utilizing heat.

With the above and other objects in view, the invention further includes the following novel features and details of construction, to be hereinafter more fully described, illustrated in the accompanying drawings and pointed out in the appended claims.

In the drawings:—

Figure 1 is a sectional view illustrating an apparatus by means of which food stuffs may be preserved.

Figure 2 is a sectional view of a paraffin dipper.

Figure 3 is a transverse section of the apparatus shown in Figure 1.

Figure 4 is a fragmentary section on the line 4—4 of Figure 1.

Figure 5 is a fragmentary section illustrating the means of exhausting air from the container and sealing the same.

Figure 6 is an enlarged sectional view of the container seal.

Figure 7 is a fragmentary perspective view of the same.

Figure 8 is an elevation partly broken away showing a glass container.

Referring to the drawings in detail wherein like characters of reference denote corresponding parts, the reference character 10 indicates a tank which is adapted to contain a quantity of paraffin indicated at 11. The lower portion of this tank is formed to provide a burner chamber 12 and located within this chamber is a burner or burners 13 to supply heat for boiling the paraffin and for heating the food stuffs as will be hereinafter explained. The burner or burners 13 may receive fuel from any suitable source and may be controlled by a valve 15.

Surrounding the container 11 and communicating with the burner chamber 12 is a heat jacket 16, heat from the burners passing upward into this jacket and out through openings 17 into the chute 22. A small fan 19 which may be driven by a motor 20 has its casing 21 in communication with the chamber 18 so as to drive the hot air into the chute 22.

Arranged at one side of the tank and within the chamber 18 is a chute 22. This chute is inclined and has its outer discharge end provided with a door or valve 23 so that this end of the chute may be closed. Openings 24 provide communication between the chamber 16 and the interior of the chute.

The reference character 25 indicates a container such as a wooden barrel, the head of which is indicated at 26. The container or barrel 25 is used for receiving the natural food stuffs and in order to render this barrel impervious to air it is dipped into the boiling paraffin 11 within the tank 10 so that it will be coated both upon the inside and outside. The head 26 is likewise dipped.

For the convenience of dipping the head there is provided a hanger 27 which rests upon a bar 28 at the top of the tank and which is provided at one end with a hook for engagement within a small opening 29 in the head. A handle 30 is provided at the upper end of the hanger 27.

Removably engaged with the chimes at opposite ends of the barrel 25 are hooks 31. These hooks are secured to the outer ends of a bridle 32 which is attached to one end of a hoisting cable 33 by means of a pulley 34. The hooks 31 have handles 35 for convenience.

The cable 33 extends over a pulley 36 which depends from a carriage 37 and the latter travels along an elevated track 38 above the tank. Attached to one end of the carriage is a cable 39, while a cable 40 is attached to the opposite end of the carriage. The cables 40 and 39 pass over pulleys 41 and 42.

The reference character 43 indicates a cup-shaped member whose open edge is provided with a rubber or other flexible member 44. This member 44 has its outer edge tapered and is adapted to be pressed into contacting engagement with the head of the barrel as shown in Figure 5 of the drawings. The cup-shaped member 43 is provided with a screen 45 and is in communication with a suitable suction device through a hose 46, communication being controlled by a valve 47. The member 43 also carries an inlet valve 48 and a vacuum gauge 49.

In carrying out the process of preserving, assuming that a wooden barrel or other wooden container is used, the container is immersed within the boiling paraffin 11 with the container open so that the paraffin will coat both the inside and outside of the container. The head is likewise immersed. This immersion of the container is effected by lowering the same within the tank and in order to prevent the container from floating upward there is provided a bar 50. One end of this bar carries a hook 51 which is engaged within an eye 52 provided on the tank while the opposite end of the bar 50 engages a T-shaped rest 55 positioned on the tank. The bar 50 is enlarged as indicated at 57 and threadedly engaged with this enlargement is a screw 58. The lower end of this screw carries a foot 59 which engages the container as shown in Figures 1 and 3, so that when the screw is properly rotated the container will be forced downward and prevented from rising. A handle 59' is provided upon the screw for convenience.

As the bridle 32 is supported by the pulley 34, this bridle may move over the pulley so that in submerging the container the open end may enter the paraffin first and when removing the container the open end may leave the paraffin last so as to properly drain the container. To facilitate this operation the bridle 32 has secured thereto a cable 60 and carries stops 61 and 62 to limit tilting movement of the barrel. A stop 63 which is adjustable upon the cable 33 regulates the depth of submergence of the container.

The heat from the burners 13 utilized for melting the paraffin is also utilized for heating the natural food stuffs to be preserved and when starting the preserving process, the gate or valve 23 is lowered to close the discharge end of the chute 22, so that heat from the chambers 16 and 18 will fill this chute. The articles to be preserved are then passed through the chute, the container having been removed to receive these articles so that they may be placed within the container while the articles and the container are still within a heated state. The boiling paraffin will render the container impervious to air and at the same time the heat of the boiling paraffin will sterilize the container.

The food stuffs to be preserved are heated to a temperature sufficient to release bacteria and when placed within the container are in a proper state for preservation. The container is closed and the head 26 has its opening 29 closed by a valve 64.

This valve may be of any flexible material, but it is preferred to make the valve of paper coated with paraffin or composition sealing wax.

In order to exhaust the air from the container the cup-shaped member 43 is placed over the valve 64 and suction through this cup-shaped member will create a partial vacuum within the container. As soon as pressure within the container and within the cup-shaped member 43 is equalized, the valve 64 will close and the valve 48 may be opened to admit air to the cup-shaped member 43. The vacuum within the container will securely hold the valve in place and as air is essential to oxidation and decay, the food stuffs within the container will be kept in a proper state of preservation. They will retain their natural flavor and condition as the temperature used in the process is not sufficiently high to cause any change. If desired, the valve 64 may be attached to the container. Any suitable means may be employed for this purpose such as a fastening device 65.

In preserving berries and other fruits having stems, the fruit is picked with the stem attached. As soon as the fruit is picked the stem is sealed by immersing the same in melted paraffin so that no air will be permitted to enter the fruit and start the process of oxidation. For convenience in sealing the stem, the invention provides a dipper which comprises a receptacle 66 having a lamp chamber 67 at the bottom. A lamp 68 or other suitable source of heat may be placed within this chamber so as to melt paraffin indicated at 69.

A float 70 rests on top of the paraffin and this float is provided with an opening so that the stem of the fruit indicated at 71 may extend downward into the paraffin to seal the end of the stem. The fruit may be placed within suitable wire containers 72 and passed through the chute 22 to be acted upon by heat from the chambers 16 and 13 and may thereafter be packed within suitable containers.

Where metal or glass containers are used such as is indicated at 72 in Figure 8 of the drawings, the tops of these containers will be provided wih an opening 73 and a valve 64a similar to the valve 64. It is of course unnecessary to treat metal or glass containers with a paraffin coating, but these metal or glass containers are subjected to treatment by boiling water, steam or dry heat of over 212 degrees Fahrenheit to render them sterile.

For the sake of convenience, "fruits" is herein used in a broad sense to include both fruit proper, vegetables, berries and other natural food stuffs, in so far as they can be preserved to advantage with the novel invention.

The invention is susceptible of various changes in its form, proportions and minor details of construction and the right is herein reserved to make such changes as properly fall within the scope of the appended claims.

Having described the invention what is claimed is:—

1. An appartaus for preserving natural food stuffs comprising a tank adapted to contain paraffin, a burner chamber beneath the tank, a source of heat within said chamber, a heat jacket surrounding the tank and communicating with the burner chamber, a hot air chamber surrounding and communicating with the heat jacket, and a chute at one side of and communicating with the hot air chambers to receive hot air from the latter to act upon the food stuffs passed through the chute.

2. An apparatus for preserving natural food stuffs comprising a tank adapted to contain paraffin, a burner chamber beneath the tank, a source of heat within said chamber, a heat jacket surrounding the tank and communicating with the burner chamber, a hot air chamber surrounding and communicating with the heat jacket, a chute at one side of and communicating with the hot air chamber to receive hot air from the latter to act upon the food stuffs passed through the chute, and a motor operated fan for driving the hot air from the chamber into the chute.

3. An apparatus for preserving natural food stuffs comprising a tank adapted to contain paraffin, a burner chamber beneath the tank, a source of heat within the chamber, a heat jacket surrounding the tank and communicating with the burner chamber, a hot air chamber surrounding and communicating with the heat jacket, a chute at one side of and communicating with the hot air chamber to receive hot air from the latter to act upon the food stuffs passed through the chute, and a food receiving receptacle adapted to be passed through the said chute.

In testimony whereof I affix my signature.

FRANK B. KUCZYNSKI.